United States Patent [19]

Ghougasian

[11] 4,341,467

[45] Jul. 27, 1982

[54] EXPOSURE GUIDE

[76] Inventor: John N. Ghougasian, 2660 Kings Bridge Ter., Bronx, N.Y. 10463

[21] Appl. No.: 189,747

[22] Filed: Sep. 23, 1980

[51] Int. Cl.³ .............................................. G03B 27/52
[52] U.S. Cl. ....................................... 355/61; 235/64.7; 355/70
[58] Field of Search ................... 235/64.7; 355/59, 61, 355/132, 18, 71, 77, 35, 83, 68, 69, 70

[56] References Cited

U.S. PATENT DOCUMENTS

| | | | |
|---|---|---|---|
| 3,719,806 | 3/1973 | Davidson | 235/64.7 |
| 3,743,821 | 7/1973 | Pamlenyi | 235/64.7 |
| 3,857,024 | 12/1974 | Kosaka | 355/35 X |
| 4,030,825 | 6/1977 | Ghougasian | 355/71 |

Primary Examiner—Richard A. Wintercorn
Attorney, Agent, or Firm—Harvey B. Jacobson

[57] ABSTRACT

A first scale component is stationarily mounted on a stationary lens component relative to which a rotatable lens component is supported. A pointer is supported from the rotatable lens component for angular displacement therewith and the first scale component includes first linear lens stop scale indicia thereon relative to which the pointer is registered and along which the pointer may swing. A second scale component including a second linear size compensation scale is provided and supported from the second scale component for back and forth shifting relative thereto for longitudinally shifting of the size adjustment scale generally along the path of swinging movement of the pointer. A third scale component including a third linear density value scale is supported from the first scale component for back and forth longitudinal shifting of the density scale transverse to the longitudinal extent of an adjacent portion of the size component scale.

3 Claims, 2 Drawing Figures

EXPOSURE GUIDE

BACKGROUND OF THE INVENTION

When preparing to reproduce a photographic print in a newspaper or similar printed material, the photographic print is photographed through the utilization of a special camera in conjunction with a halftone screen, or the like, and in order to produce a halftone negative of the photographic print at the same or different size suitable for producing a plate to be utilized in the newspaper printing of the photographic print, it is often necessary to compensate for varying densities of photographic prints, different sizes of photographic prints and photographic prints having different contrast.

Although the reproduction camera to be used in producing a suitable halftone negative may be experimented with insofar as lens aperture is concerned and "flashing" and "bumping" may also be carried out in an experimental manner until the desired halftone negative is produced, such experimentation, even by an experienced photographer, is very time consuming with the result that the expense of producing a printed reproduction of a photographic print can be cost prohibitive, at least where a considerable number of photographic prints are concerned. Accordingly, a need exists for a means by which correct changes in copy camera lens aperture settings may be made in order to compensate for size differences, print density variations and variations in print contrast.

BRIEF DESCRIPTION OF THE INVENTION

The exposure guide of the instant invention is to be mounted upon the lens plate of a copy camera and includes the usual arcuate lens stop scale, a pointer supported from the rotatable portion of the copy camera lens and registered with the lens stop scale, a linear size compensation scale shiftably supported for back and forth longitudinal shifting transversely of the pointer and a third linear density scale relative to which the size compensation scale may be shifted, the third density scale also being shiftably supported relative to the first scale.

The main object of this invention is to provide a copy camera exposure guide which may be utilized efficiently by experienced photographers to substantially reduce the guess work and time consuming trial and error photography involved in producing a halftone negative of copy work suitable for high grade printing reproduction and especially when the halftone negative it to be of a different size than the copy work, the copy work is of an average density not ideal for halftone negative reproduction and/or the contrast of the copy work is other than ideal.

Another object of this invention is to provide an exposure guide in accordance with the preceding objects and which may be readily retrofitted to existing copy camera lens systems.

Still another important object of this invention is to provide an exposure guide in accordance with the preceding objects and which may be readily incorporated into the manufacture of new copy work cameras.

Another object of this invention is to provide an exposure guide including indicators thereon to be used in conjunction with "flashing" and "bumping".

A final object of this invention to be specifically enumerated herein is to provide an exposure guide in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
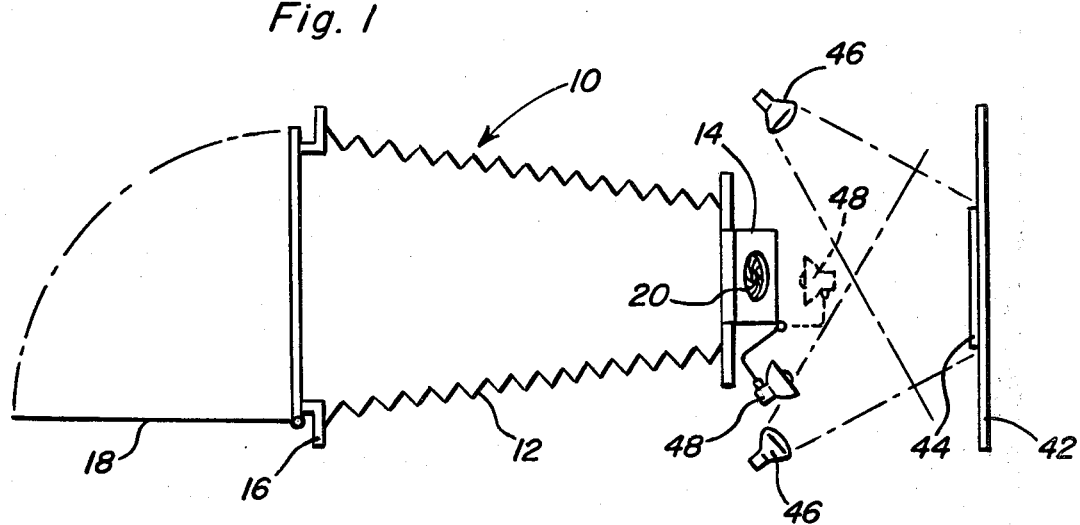
FIG. 1 is a schematic view illustrating the manner in which a copy camera is utilized to produce a halftone negative suitable for printing reproduction of a photographic print.
Figure 2:
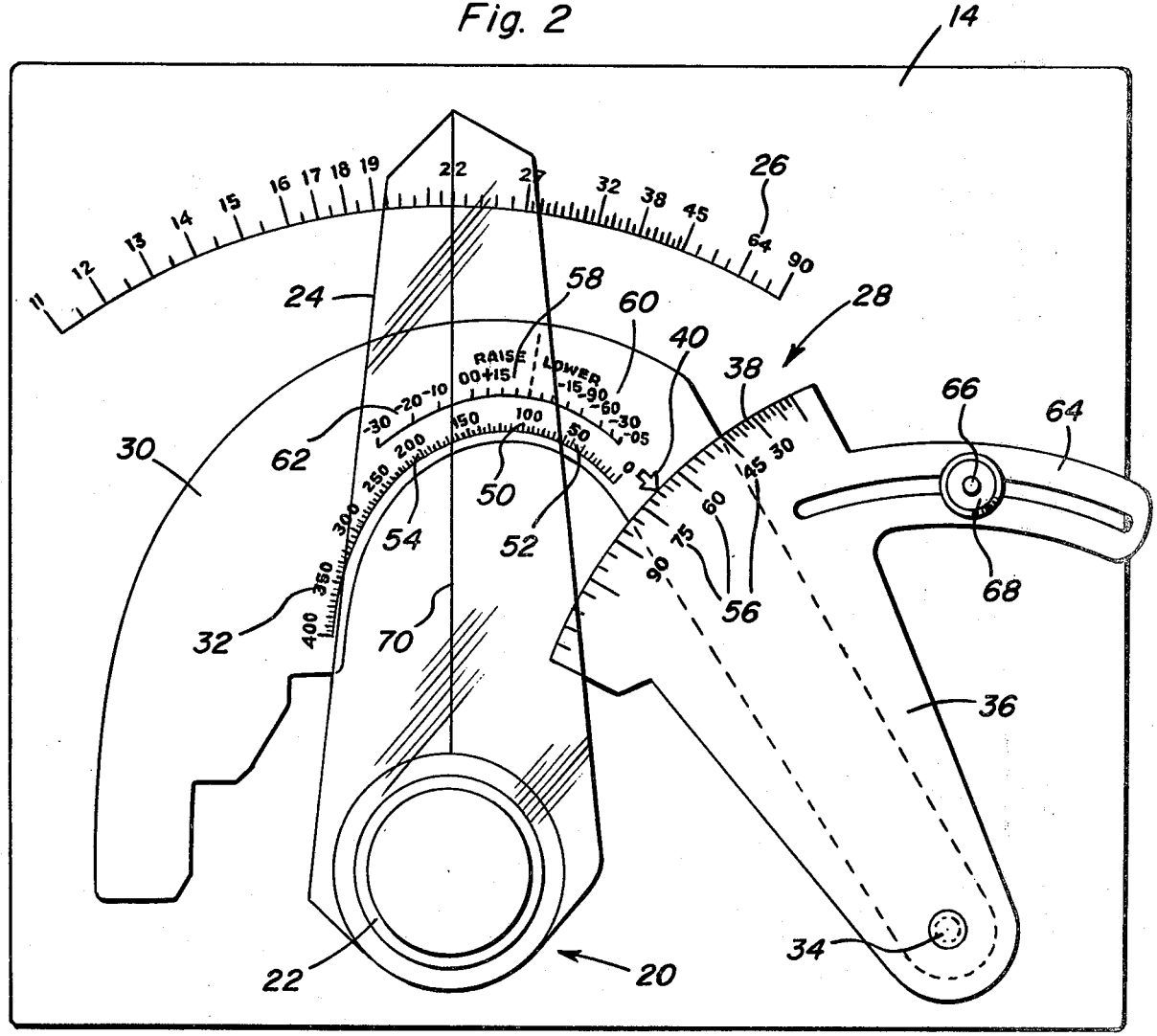
FIG. 2 is an elevational view of the exposure guide of the instant invention as operatively associated with the lens support plate or board of the copy camera illustrated in FIG. 1.

Referring now more specifically to the drawings, the numeral 10 generally designates a copy camera including a bellows 12 supporting a lens mount plate or board 14 from one end thereof and in turn having its other end supported from the body 16 of the camera 10. The body 16 includes a hinged back plate or cover 18 from which a halftone screen and negative film plate may be supported, the back plate or cover 18 being swingable between the open position thereof illustrated in FIG. 1 and a closed position closing the back of the camera.

The lens mount plate or board 14 supports a lens assembly 20 therefrom including a rotatable component 22 having a pointer 24 mounted thereon. In addition, the lens mount plate or board 14 conventionally includes an arcuate linear lens aperture scale 26, as is conventional.

The exposure guide of the instant invention includes the scale 26. The lens mount plate or board may be considered as a stationary lens component and the component 24 may be considered as a rotatable lens aperture adjusting component. Further, the scale 26 may be considered as a first scale relative to which the pointer 24 may be swung for testing the screened negative exposure.

The scale 26 and pointer 24 comprise integral portions of the exposure guide of the instant invention referred to in general by the reference numeral 28. The exposure guide 28 further includes a second scale component 30 having a second arcuate linear scale 32 thereon. The linear scale 32 comprises a size compensation scale and the component 30 is supported from the stationary component 14 for swinging about a fixed axis through the utilization of a pivot fastener 34 which may include friction means (not shown) for frictionally retaining the component 30 in adjusted angularly displaced positions relative to the component 14. In addition, the exposure guide 28 further includes a third scale component 36 having an arcuate linear density compensation scale 38 thereon. The linear scale 38 comprises a density value scale and is longitudinally shiftable transversely of one end of the size compensation scale 32, the component 30 including an arrow 40 thereon with which the scale 38 may be adjustably registered.

As is conventional, a support 42 is provided for the photographic print 44 to be copied and the print 44 may be illuminated as required by suitable lights 46. In addition, the component 14 supports a swingable light 48 therefrom which may be utilized for "flashing" and "fogging". "Flashing" is to be accomplished with the light or lamp 48 in the phantom line position thereof illustrated in FIG. 1 and in conjunction with a halftone screen and also a suitable filter. On the other hand, "fogging" is to be effected without use of the halftone screen, but in conjunction with a suitable filter, or a suitable corrected grey-holding pre-mask.

The scale 32 includes indicia 50 with which the pointer is to be aligned for one-to-one ratio reproduction work. Fifty percent size reduction copy work requires the registry of the pointer 24 with the indicia 52 of the scale 52 and 100% enlargement of the copy print 44 requires the pointer 24 to be registered with the indicia 54 of the scale 32. Thus, the function of the scale 32 is believed to be readily understandable from the foregoing.

The density value scale 38 includes graduated indicia 56 for registry with the indicia 40 to indicate variations in the mean density value to the photographic print 44 and the scale component 30 additionally includes a first supplemental scale 58 for raising or lowering the overall density range without a filter, a second supplementary scale 60 for "flashing" in the case of excessive shadow densities and a third supplemental scale 62 for "bumping" in conjunction with the filter and without use of a halftone screen for rendition of high lights or separation of whites from grays on the photographic print.

The component 36 includes a slotted arcuate arm 64 through which the threaded shank 66 of a clamp-type fastener 68 is slidingly received and the third component 36 will be initially set according to the associated camera and thereafter maintained stationary in substantially all cases. Initial experimentation and trial and error may be necessary to set the third component 36 relative to the stationary component 14. However, after the third component 36 has been initially adjusted, the only further adjustments of the exposure guide will be carried out in adjusting the rotatable lens component 22 and thus the pointer 24 and the second scale component 30 relative to the board 14.

In operation, once the third component 36 has been set for the particular camera, the density of the copy print 44 is determined by a densitometer and the second component 30 is shifted relative to the third component 36 in order to register the arrow 40 with the reading of the densitometer. Thereafter, the pointer 24 is swung relative to the second component 30 to register the center line 70 of the pointer 24 with the proper indicia on the scale 32. If the negative is to be the same size as the copy print 44, the center line 70 is registered with the indicia 50 on the scale 32. Then, a test exposure is carried out in order to expose a negative film sheet in front of the back plate or cover 18 having a halftone screen registered therewith. The test film sheet is developed and the resultant negative is examined to determine its "printing value". If the negative is too dark, the next test exposure may be accomplished at the lens aperture opening determined by a slight swinging of the pointer 24 to the left of the indicia 100 on the first supplemental scale 58. Further, if it is determined that "bumping" or "flashing" is required, the next test print is "bumped" and/or "flashed" by swinging the pointer 70 to the left or right in registry with the appropriate indicia on the scales 62 and 60.

In the event the first test negative is to be twice the size of the copy print 44, after the second scale component 30 is adjusted in position as in the previous case, the pointer 24 is swung to the left to register the center line 70 thereof with the indicia 54 on the scale 32. Then, the initial test negative is exposed with the lens aperture as indicated by the center line 70 on the scale 26. Thereafter, if the test negative is not of proper "printing value", the scale component 30 is swung to the right to register the indicia 100 on the scale 32 with the center line 70 of the component 30 and the previously mentioned successive steps may be carried out in order to lighten the negative and/or accomplish "bumping" and/or "flashing". Once the indicia 50 on the scale 52 has been registered with the center line 70, increases and decreases in lens aperture opening for lightening or darkening the negative may be accomplished by thereafter swinging the pointer 24 to the left or right on the first supplemental scale 58 and to the left or right during subsequent "bumping" and/or "flashing" operations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a copying camera lens assembly of the type including a base having stationary lens assembly mounted thereon including a rotatable lens aperture adjusting component, an exposure guide including a first scale component stationarily mounted on said base, a pointer mounted relative to said rotatable lens component for angular displacement therewith relative to said first scale component, said first scale component including a first linear lens stop scale thereon relative to which said pointer is registered and along which said pointer may swing, a second scale component including a second linear size compensation scale thereon with which said pointer is registered and along which said pointer may swing, means supporting said second scale component from said base for lengthwise back and forth shifting relative thereto to effect longitudinal shifting of said size adjustment scale transversely of said pointer in a path generally paralleling the plane in which said pointer is swingable, and a third scale component including a third linear density value scale thereon, means supporting said third scale component from said base for back and forth shifting relative thereto for longitudinal shifting of said density scale transverse to the longitudinal extent of an adjacent portion of said size compensation scale, said size compensation scale being arcuate and said second scale component being pivotally supported from said first scale component for angular displacement about an axis appreciably spaced from and general paralleling the axis of rotation of said lens aperture adjusting component relative to said stationary component, said second scale component including indicia registered with and movable along said third scale component responsive to angular displacement of said second scale component relative to said base and said third scale component, said first linear scale being arcuate and extending along an arc segment generally concentric with the center of angular displacement of said pointer relative to said base, said second scale component being pivotally supported from said base, said second linear size compensation scale also being arcuate and lying upon an arc segment whose radius of curvature is appreciably shorter than the spacing of said second linear size component scale from the pivot axis of said second scale component relative to said base, one end portion of said second linear size compensation scale extending generally radially of said last mentioned axis, said third scale component being pivotally supported from said base for angular displacement relative thereto about said last mentioned axis, said third linear density value scale being arcuate and extending along an arc segment generally concentric with said axis last mentioned, said second scale component including indicia adjacent said one end of said second linear size compensation scale registered with said third linear density value scale.

2. The combination of claim 1 wherein said linear size compensation scale includes a central portion thereof indicating one-to-one size ratio and a first supplemental linear scale extending along said central portion and including opposite end portions indicating increases and decreases in lens aperture opening for effecting lightening and darkening of subsequent test negatives.

3. The combination of claim 2 wherein the opposite end portions of said linear size compensation scale including second and third linear supplemental scales registered therewith and extending therealong and disposed at opposite ends of said first supplemental scale, said second and third supplemental scales indicating decreases and increases, respectively, in lens aperture opening for use in "flashing" and "bumping".

* * * * *